(12) United States Patent
Gordon

(10) Patent No.: US 7,886,701 B1
(45) Date of Patent: Feb. 15, 2011

(54) DOG COLLAR

(76) Inventor: Barbara Jolanta Gordon, P.O. Box 8481, Northridge, CA (US) 91327

( * ) Notice: Subject to any disclaimer, the term of this patent is extended or adjusted under 35 U.S.C. 154(b) by 793 days.

(21) Appl. No.: 11/728,143

(22) Filed: Mar. 23, 2007

(51) Int. Cl.
*A62B 35/00* (2006.01)
(52) U.S. Cl. .................................................. 119/863
(58) Field of Classification Search ................ 119/792, 119/793, 863, 864, 856, 857; 63/3, 3.1, 3.2
See application file for complete search history.

(56) References Cited

U.S. PATENT DOCUMENTS

| | | | | |
|---|---|---|---|---|
| 649,026 | A * | 5/1900 | Wood | 119/856 |
| 3,817,218 | A | 6/1974 | Bongiovanni | |
| 4,020,795 | A | 5/1977 | Marks | |
| 4,270,492 | A | 6/1981 | Goheen | |
| 4,697,436 | A * | 10/1987 | Schmidt | 63/3 |
| 4,753,086 | A * | 6/1988 | Schmidt | 63/3 |
| 4,996,948 | A | 3/1991 | Klein et al. | |
| 5,003,930 | A | 4/1991 | Shields | |
| 5,109,803 | A | 5/1992 | Dunham et al. | |
| 6,122,933 | A * | 9/2000 | Ohlund | 63/3 |
| 6,457,328 | B1 * | 10/2002 | Tsai | 63/3 |
| 6,470,708 | B1 | 10/2002 | Green | |
| D499,351 | S * | 12/2004 | Hardy | D11/13 |
| D508,865 | S | 8/2005 | Maduass et al. | |
| 7,093,332 | B1 | 8/2006 | Kay | |
| 7,168,394 | B2 * | 1/2007 | Berry | 119/863 |
| D551,585 | S * | 9/2007 | Wooley et al. | D11/11 |
| D562,171 | S * | 2/2008 | Remington | D11/3 |
| 2004/0007017 | A1 | 1/2004 | Flaherty | |
| 2006/0042562 | A1 * | 3/2006 | Wagner | 119/792 |

* cited by examiner

*Primary Examiner*—Timothy D Collins
*Assistant Examiner*—Monica Williams
(74) *Attorney, Agent, or Firm*—Colin P. Abrahams

(57) ABSTRACT

A dog collar comprises a flexible non-metallic cord component having first and second ends and comprising an inner cord surrounded at least in part by an outer cord sheath. A fastening mechanism is provided and has a band defining a space at the first end of the cord component and a fastening bar at the second end of the cord component. The fastening bar and band are dimensioned such that the fastening bar is able to pass through the space in one orientation and not able to pass through the space when in other orientations.

12 Claims, 3 Drawing Sheets

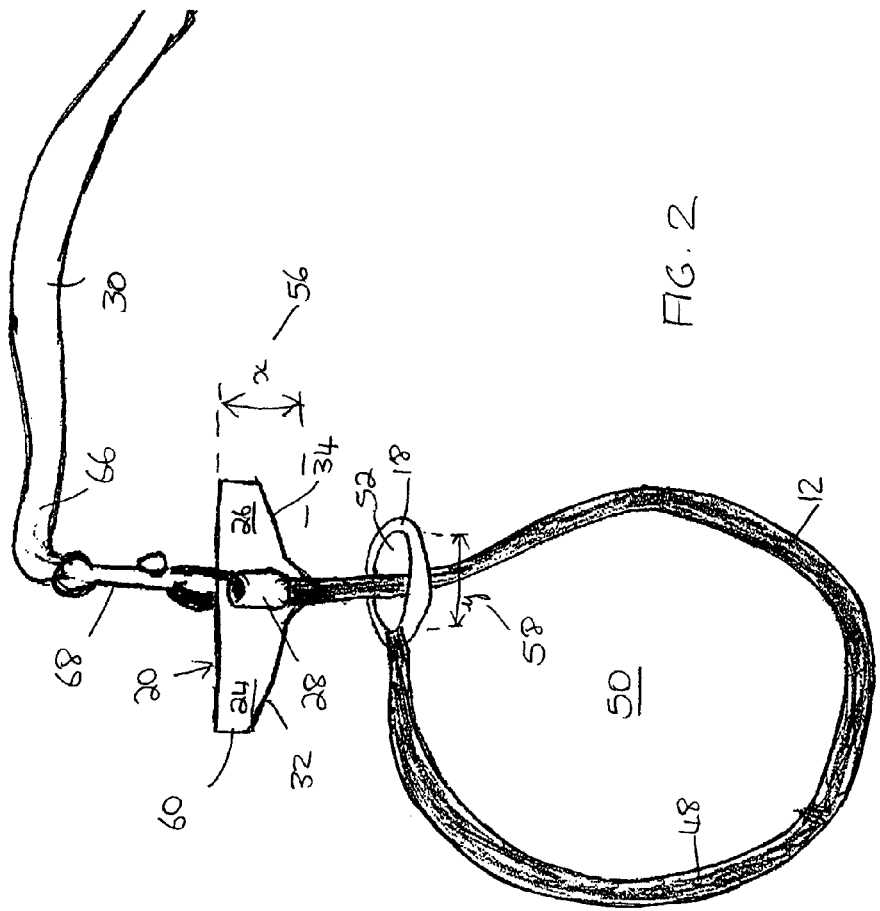
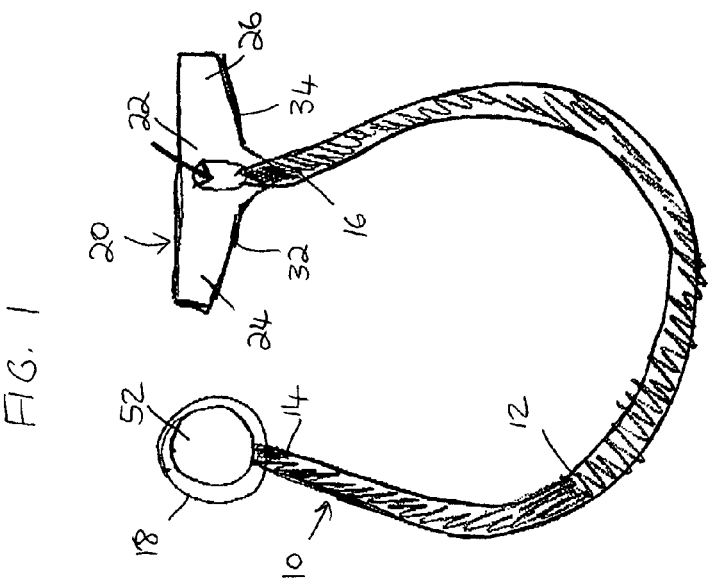

DOG COLLAR

FIELD AND BACKGROUND OF THE INVENTION

This invention relates to a dog collar, generally of the dog choke-chain type, and which may often be used in association with dog training.

Dog collars are, of course, widely used and have been in existence for many years. There are a large number of dog collars available, with varieties to suit many different situations and a wide spectrum of dog sizes. Most of these collars will have an attachment mechanism of some sort whereby the collar can be releasably secured to a leash, so that the dog can be walked, trained or otherwise restrained, depending upon the circumstances. While some dog collars are intended to remain on the dog at all times, other types of dog collars may be used in certain circumstances, such as when the dog is being walked or is in an environment where it is necessary to maintain control or correct unwanted behavior of the dog in case it should suddenly be distracted, bolt, threaten others in the vicinity or place itself in harm's way.

Removable collars for the purposes of walking and training a dog are also well known. A typical dog collar for such a purpose is sometimes known as a "choke-chain" type collar, and typically consists of a length of metal chain, the metal chain having a metal end ring at each end thereof. In use, the metal chain is pulled through one of the end rings, to create a loop, and the dog's head, is placed in and through the loop until the choke-chain collar is located around the dog's neck. Since the metal end rings are typically of the same size, one metal end ring will not be able to pass through the other, therefore defining a limit as to how big the loop, defined by the length of the metal chain, can get. One of the metal end rings may be attached to a leash at one end thereof, and the leash is held at or near the other end by the person controlling the dog, in conventional fashion.

One feature of the choke-chain type dog collar is that it generally fits loosely around the dog's neck under normal circumstances. However, if the dog should attempt to run off, the leash will tighten, pulling on the metal end ring to which it is attached, causing the metal chain to slide through a metal end ring, and the loop to get smaller. Eventually, the loop defined by the metal chain will be the same as the size of the dog's neck. Such as choke-chain collar, also referred to herein as a "noose" type device, has certain advantages. First, it maintains the collar loosely in a relaxed state around the dog's neck in normal circumstances, and does not interfere with the dog's mobility and movement. However, when the dog pulls on the leash, the chain tightens to reduce the possibility that the animal will escape from the chain. Second, if the animal should pull too hard, the metal chain will tighten around the neck, forcing the animal to stop pulling so as to release the pressure which may arise from the discomfort caused by the tight metal chain. The choke-chain type arrangement is therefore important when training dogs, since a dog will only be so restrained by the choke-chain when it tries to run off or displays other types of unacceptable behavior.

U.S. Pat. No. 4,270,492 (Goheen) discloses a hitch for animals including handles 2 and 3 which pass through a cylinder A. U.S. Pat. No. 4,996,948 (Klein) teaches an animal collar, particularly an animal slip-collar, made of flexible material such as chain links. This collar includes a T-shaped grip 19, and a metal chain.

U.S. Pat. No. 3,817,218 (Bongiovanni) shows a dog collar with a metal chain covered by a tube of tough plastic to avoid contact by the chain with the dog's neck. U.S. Pat. No. 4,020,795 (Marks) teaches a choke collar for pets wherein a sheath of synthetic plastics material encloses a wire cable core for substantially its entire length, and is preferably impregnated with a pesticidal composition. See, for example, FIG. 2 which shows the structure. U.S. Pat. No. 5,003,930 (Shields) teaches a unitary plastic training collar for animals, and is comprised of a polymeric material.

U.S. Pat. No. 5,109,803 (Dunham) teaches a pet collar encased in the sleeve of a pliant non-chafing material, including padding on at least one surface in contact with the pet's neck region. The sleeve forms an annular cylinder having a longitudinal portion. U.S. Pat. No. 7,093,332 (Kay) teaches a locking toggle assembly for jewelry, including a toggle clasp selectively moveable between an open position in which the toggle bar may pass through the opening, and a locked position in which the toggle bar is prevented from passing through the opening.

U.S. Patent Publication No. US2004/0007017 (Flaherty) relates to jewelry, particularly a necklace with a detachable necklace strand.

SUMMARY OF THE INVENTION

According to one aspect of the invention, there is provided a dog collar comprising: a flexible non-metallic cord component having first and second ends and comprising an inner cord surrounded at least in part by an outer cord sheath; and a fastening mechanism having a band defining a space at the first end of the cord component and a fastening bar at the second end of the cord component, the fastening bar and band being dimensioned such that the fastening bar is able to pass through the space in one orientation and not able to pass through the space when in other orientations.

Preferably, the inner cord comprises a braided nylon cord, and the outer cord sheath comprises a plastic sheath. In one form, the outer cord sheath substantially surrounds the entire inner cord.

In one aspect, the band comprises a substantially circular metal ring. Further, the fastening bar may comprise a central portion and a pair of lateral wings extending outwardly from the central portion, the height of the central portion and wings being less than the distance of the space of the metal ring.

Preferably, the fastening bar comprises a connector for connecting the fastening bar to a leash.

In one preferred embodiment, the fastening bar comprises a cutting mechanism thereon. In this embodiment, the fastening bar may have a slot formed therein capable of receiving at least in part the cord component, and the cutting mechanism may comprise a first fixed cutting surface above the slot and a second movable cutting surface below the slot, the second movable cutting surface being selectively movable so as to engage with the first cutting surface and to sever the cord component when placed between the first and second cutting surfaces.

In one aspect, the second movable cutting surface is attached to an arm and a handle, the second movable cutting surface, arm and handle being pivotally mounted so that the second movable cutting surface is movable between a first position, away from the first cutting surface, and a second position, directly adjacent the first cutting surface.

In another embodiment, the cutting mechanism comprises a slot in the fastening bar, the slot having therein at least one blade surface, the blade surface being capable of engaging the cord component and severing it when moved thereover.

According to another aspect of the invention, there is provided a dog collar comprising: a flexible, non-metallic cord component having first and second ends; and a cutting mechanism attached on or adjacent the cord component.

Preferably, the cord component has a metal ring at one end thereof, and a fastening bar at an other end thereof, the cutting mechanism being formed on the fastening bar. The cutting mechanism may comprise a first fixed cutting surface above the slot and a second movable cutting surface below the slot, the second movable cutting surface being movable so as to engage with the first cutting surface and to sever the cord component when placed between the first and second cutting surfaces.

In another aspect, the cutting mechanism comprises a slot in a fastening bar, the slot having therein at least one blade surface, the blade surface being capable of engaging the cord component and severing it when moved there over.

The present invention is a dog collar, preferably used for training in one aspect thereof, comprising a flexible, elongate member, a ring at one end of the flexible, elongate member and a stop means at the other end of the flexible, elongate member, the flexible, elongate member comprising a central, non-metallic strip surrounded by a non-metallic sheath.

Preferably, the flexible member has a ring at one end, and the stop means comprises a metal T-bar secured at the other end, the metal T-bar being shaped and dimensioned so that it can be threaded through the metal ring and thereafter oriented to a default position so that a releasable connection is formed between the metal ring and the metal T-bar.

Preferably, the flexible elongate member comprises an inner portion made of a nylon braided cord, or other suitable fabric, and is surrounded and covered by a plastic or PVC sheath.

It is a feature in accordance with one aspect of the invention that the flexible member be comprised of a material or materials which can be readily cut by a blade, scissors or other appropriate cutting instrument. One of the disadvantages of a conventional metal chain is that it can only be removed over the dog's head, and then only when the loop, defined by the metal chain, is sufficiently large so as to accommodate the largest part of a dog's head. This can be a serious problem and a safety threat to the dog or others, when, for example, the dog is in a fight, is pulling hard on the leash and will not stop, and may cause itself serious injury and choking if the collar is not removed. A metal chain, as mentioned above, can only be removed'from the dog by passing it over the dogs's head. In accordance with an aspect of the present invention, the owner or trainer of the dog can, when the situation warrants, cut the flexible member of the collar in accordance with the present invention in emergency situations and therefore release the dog from the collar to prevent potentially serious injury.

Preferably, the inner portion of the flexible member is made of a reasonably strong material, but which is nevertheless capable of being cut by a blade or a pair of scissors, such as a braided nylon cord. The outer sheath component of the flexible elongate member is placed on or over the inner nylon cord, and the outer sheath would preferably be comprised of materials chosen for their ability to slide easily so that the training collar, or choke-chain, in accordance with the invention, can easily and without undue effort open and close the size of the loop. Furthermore, some dogs may be startled by the sudden metallic noise of the metal chain on the metal rings, or may find it disconcerting or irritating. A dog collar in accordance with the present invention would avoid this situation since the materials are preferably chosen so as not to make noises unpleasant or distracting to the dog.

In accordance with another aspect of the invention, there is provided a cutting member mounted on or a part of the collar at some selected location thereof which can be used to cut through the collar in case of an emergency. Preferably, the cutting member is shielded, when not in use, in such a manner that at least the sharpened or cutting edges thereof are covered so that they will not harm the animal, other animals or the handler in any way.

The cutting member may be in the form of a blade, a pair of scissors or such other mechanism to allow the collar to be cut in case of emergencies.

The collar, in accordance with one aspect of the invention, may have a mechanism for securing which does not require that the looped chain or flexible member go around and over the dog's head. In one form, a ring member is provided at one end of the flexible member, while a T-bar or similar type structure is provided at the other end, the T-bar being capable of threading through the ring in a manner such that it can be re-oriented after passing through the ring to form a fastening mechanism. As such, it is not necessary that the collar go over the head of the dog when placing or removing the collar, but it can be fitted around the neck, so avoiding further struggling to get an otherwise tight collar on or off the dog over its head.

The materials from which the collar is made are preferably chosen such that skin chaffing and fur damage would be minimized or decreased, but at the same time still ensure that a quick mechanism and procedure for tightening and releasing the collar around the dog's head and/or can be achieved without startling the dog with the sound of the chain grating against the ring and remainder of the chain.

Furthermore, in case of an emergency, not only is it possible to cut the dog collar, as described above, but where the T-bar fastening type mechanism is used, this can be disconnected from the ring on the flexible member or cord without pulling the collar over the dog's head.

BRIEF DESCRIPTION OF THE DRAWINGS

FIG. 1 is a front view of a dog collar in accordance with one aspect of the invention, the collar shown in the disconnected position;

FIG. 2 is a front view of the dog collar shown substantially as in FIG. 1 of the drawings, but in the releasably connected position, and with a leash secured thereto;

FIG. 3 is a detail showing the construction of the dog collar cord;

DETAILED DESCRIPTION OF THE INVENTION

Figure 5:
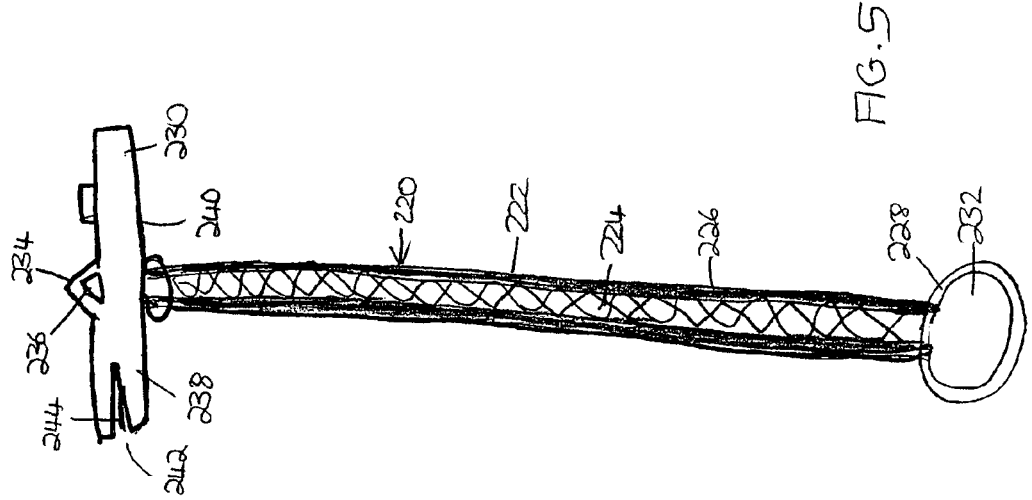
FIG. 5 is a front view of yet a further embodiment of the invention, also showing a cutting mechanism formed thereon.

The invention comprises a collar for a dog. The collar comprises an elongate cord having connector members at each end which can be releasably secured to each other so that the cord defines a closed loop which, in use, surrounds the neck of the dog.

Referring to FIG. 1 of the drawings, there is shown a dog collar 10 comprising an elongate cord 12 having an end 14 and an opposite end 16. The end 14 has a metal ring 18 attached thereto. The end 16 has a metal T-bar 20 attached thereto, the T-bar 20 having a central portion 22 and a pair of lateral wings 24 and 26 extending outwardly from the central portion 22. The central portion 22 includes an aperture 28 for releasably clamping the T-bar 20 to a leash 30, as better shown in FIG. 2 of the drawings.

Each lateral wing 24 and 26 has an abutment surface 32 and 34 respectively, which engages the metal ring 18, as will be described below.

As regards the elongate cord 12, a detail of the cord can be seen in FIG. 3 of the drawings. In accordance with one aspect of the invention, the elongate cord or flexible member 12 comprises an inner braided cord 40, and an outer plastic sheath 42 which completely surrounds and encloses the inner braided cord 40. The inner braided cord 40 provides considerable strength and will not, under normal circumstances, snap, fray or otherwise break. In accordance with one aspect of the invention, the inner braided cord 40 is preferably comprised of a material such as nylon, and is not made of metal or some other hard material which could not be cut by a blade, scissors or other conventional cutting mechanism in a quick and efficient way.

The outer plastic sheath 42 is preferably comprised of a suitable plastic which will not irritate the dog, or cause discomfort or damage to fur or skin, and is also selected so that the elongate cord 12 can slide fairly readily in the metal ring 18, as will be described.

Reference is now made to FIG. 2 of the drawings, which shows the dog collar 10 configured so as to form a loop 48. The elongate cord 12 has passed through the metal ring 18, forming the loop 48, the loop 48 in turn defining a space 50. The space 50 can, of course, vary in shape and size, depending upon the position of the metal ring 18 with respect to and along the elongate cord 12.

The dog collar 10 is configured into the loop-type arrangement as shown in FIG. 2 by manually grasping the metal T-bar 20 and threading it through the inner space 52 defined by the metal ring 18. As shown in FIG. 2, the height of the metal T-bar 20 is shown by the letter "x", as indicated by the reference numeral 56. The inner diameter of the metal ring 18 is indicated by the letter "y", as shown by the reference numeral 58. It will be appreciated that the distance "x" is less than the distance "y".

In forming the loop arrangement as shown in FIG. 2, the dog trainer or handler will typically grasp the wing 26, and thread the metal T-bar 20 through the inner space 52. This will be accomplished by ensuring that leading edge 60 of the metal T-bar 20 is first passed through the space 52 with the remainder of the metal T-bar 20 and attached elongate cord 12 following. Once the entire metal T-bar 20 has passed through the inner space 52 of the metal ring 18, dragging the elongate cord 12 to which it is connected, through the inner space 52 as well, the metal T-bar 20 is re-oriented as shown in FIG. 2. In this way, when it is attempted to pull the metal T-bar 20 through the inner space 52, this will not be possible, since the abutment surfaces 32 and 34 of the lateral wings 24 and 26 will engage the metal ring 18 to prevent this. The loop can only be disconnected by turning the metal T-bar 20 on its side, and threading it through the inner space 52 using the leading edge 60 first (or the opposite end of the metal T-bar which may of course also serve as the leading end).

As shown in FIG. 2, a leash 30 is provided having a leash end 66, the leash end 66 being connected to a clamp 68. The clamp 68 has a conventional spring-loaded movable bar which can be opened and closed so that the clamp can be secured to the aperture 28 in conventional fashion.

It will be appreciated that the dog collar 10 as shown in FIGS. 1 and 2 of the drawings can be placed around the neck of the dog in two possible ways. The first way is to ensure that the space 50 is at its largest capacity, and then thread the dog collar 10 over the head of the dog, and then pull the elongate cord 12 through the metal ring 18 to provide a comfortable fit. However, the invention also allows the dog collar 10 to be placed on the dog without pulling it over the head. In this scenario, the elongate cord 12 will be placed around the neck of the dog, and the metal T-bar 20 will be passed through the metal ring 18, as discussed above, to effect the necessary fastening. For many dogs, passing the collar over the head can be unpleasant, and, too loose or too tight, and many dog handlers may prefer to place the dog collar 10 on the dog without threading it over the head. This embodiment of the dog collar of the invention facilitates a better fit on the dog because it does not have to be large or long enough to go over the head of the dog and thereafter become too loose around the neck to be effective for training. An optimal fit for this type of dog collar is preferably, but not necessarily, the size of the dog's neck plus about 2 inches. Such a size would typically not be large enough to form a loop which would go over the head of the dog.

The dog collar 10 will mainly operate in conventional fashion, generally being loosely located around the dog's neck with the space 50 larger than the size of the dog's neck. However, if the dog should attempt to run off, strain, or otherwise behave inappropriately, the space 50 will shrink in size as a result of the leash 30 pulling on the metal T-bar 20, thus attempting to restrain or correct the dog's behavior and provide a training procedure with a negative restraint consequence.

Figure 4:
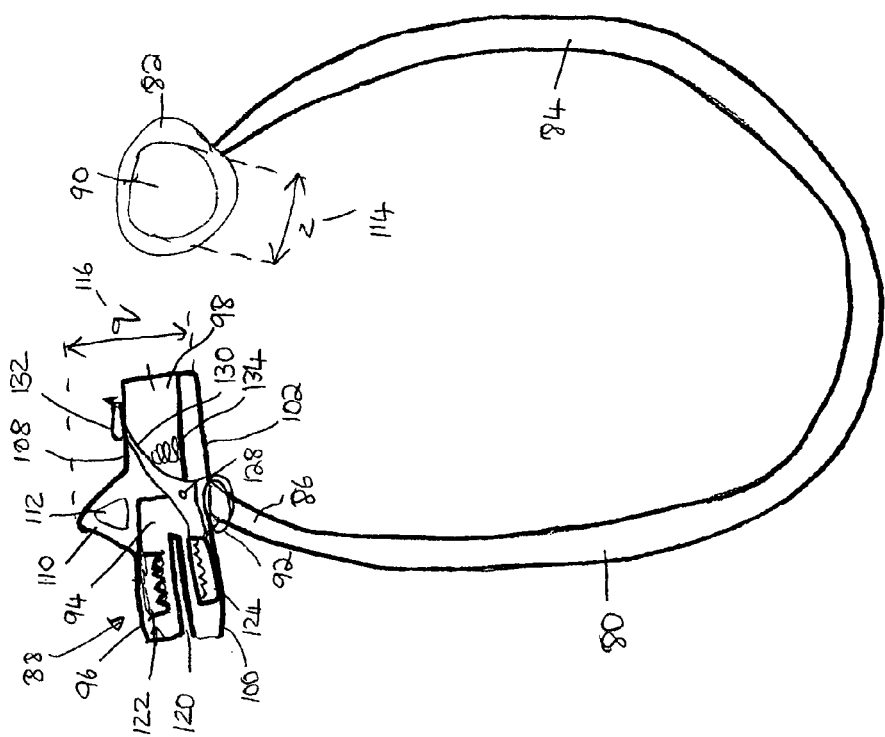
FIG. 4 is a front view of a dog collar in accordance with another aspect of the invention including a cutting mechanism incorporated therein.

With reference to FIG. 4 of the drawings, there is shown another embodiment of the invention, comprising a dog collar 80 including a metal ring 82 on one end thereof, the dog collar 80 also comprising the elongate cord 84. The elongate cord 84 may be comprised of the same components and materials as previously described with respect to the embodiment illustrated in FIG. 1 of the drawings. Thus, the elongate cord 84 will have an inner braided cord 40 surrounded by an outer plastic sheath 42, with the general characteristics and advantages which have already been described.

At the end 86 of the elongate cord 84, remote from the metal ring 82, there is fixed a fastening bar and cutter combination 88. The fastening bar and cutter combination 88 generally has a somewhat similar profile and configuration to the metal T-bar 20, as shown in the previous figures, in that it is capable of passing through the inner space 90 of the metal ring 82 when held at the appropriate orientation, and locked when reoriented to prevent such passage.

The fastening bar and cutter combination 88 includes a connector 92, by means of which it is fastened to the end 86 of the elongate cord 84. The combination 88 has a central portion 94, a lateral wing 96 and a lateral wing 98. Each of the lateral wings 96 and 98 has a lower abutment surface 100 and 102 respectively.

The lateral wing 98 is generally of block shape, while the lateral wing 96 is configured so as to constitute a cutting mechanism, as will be described.

The fastening bar and cutter combination 88 comprises an upper surface 108 and a leash connector 110 formed on the upper surface 108, including an aperture 112 by means of which the clamp on the leash can be connected in conventional fashion, as described.

It will be seen that the inner diameter of the metal ring 82 is of distance "z" and is indicated by reference numeral 114. The thickness of the fastening bar and cutter combination 88 is indicated by the letter "q" as shown by reference numeral 116. It will be appreciated that the distance "z" is greater than the distance "q" so that the fastening bar and cutter combination 88 and elongate cord 84 to which it is attached can be threaded through the inner space 90 of the metal ring 82, and thereafter re-oriented so that the lower abutment surfaces 100 and 102 lean up against the metal ring 82 to prevent the combination 88 from passing therethrough. In this regard, the operation of the combination 88 with respect to the metal ring 82 is more or less the same as that described with respect to the metal T-bar 20 and metal ring 18 in the previous embodiments.

Reference is now made to the lateral wing 96, which operates as the cutter portion of the fastening bar and cutter combination 88. It will be seen that the lateral wing 96 includes a slot 120 more or less in the middle of the wing 96. Above the slot 120 there is formed a serrated or sharpened upper cutting surface 122, which is fixed. A lower cutting surface 124 is located near the bottom part of the lateral wing 96, below the slot 120. The lower cutting surface 124 is pivotally mounted about pivot 128, and includes an arm 130 and handle 132. A spring 134 normally urges the arm 130 upwards, so that the lower cutting surface 124 is, in normal use, held away from the upper cutting surface 122. However, the lower cutting surface 124 can be pivotally moved about the pivot 128 when the handle 132 is pressed against the bias of the spring 134, and this operation has the effect of moving the lower cutting surface 124 towards the upper cutting surface 122.

As will be seen from the drawings, the elongate cord 84, or a section thereof, can be inserted in the slot 120, if it becomes necessary to sever or cut the elongate cord 84, and the cutting of the cord 84 can be effected by pushing down hard on the handle 132, severing the cord 84 at the point where it is between the upper cutting surface 122 and the lower cutting surface 124, when placed in the slot 120.

With reference to FIG. 5 of the drawings, there is shown a further embodiment, a collar 220 including an elongate cord 222 having an inner nylon cord 224 surrounded by a plastic sheath 226, in much the same configuration as previously described. One end of the cord 222 has a metal ring 228 while the other end has attached thereto a fastening bar 230. The dimensions of the fastening bar 230 are such that it can be inserted through the space 232 defined by the metal ring 228, again in much the same manner as has already been described. The fastening bar 230 includes a leash connector 234 having an aperture 236 for connection to a clamp of the leash.

The fastening bar 230 has lateral wings 238 and 240, and it will be seen that the lateral wing 238 includes a tapering slot 242 including a blade surface 244. The blade surface 244 may be formed along one or more of the surfaces of the slot 242, or within the slot 242, and a variety of modifications in this regard are within the scope of the invention.

In use, and particularly in certain emergency situations, as have been described above, the cord 222 may be severed by inserting any portion thereof, as may be convenient, into the slot 242 and pulling it over the blade surface 244. This will have the immediate effect of releasing the collar 220 from the dog, and alleviating any tension around the neck of the dog to prevent possible asphyxiation.

Figure 6:
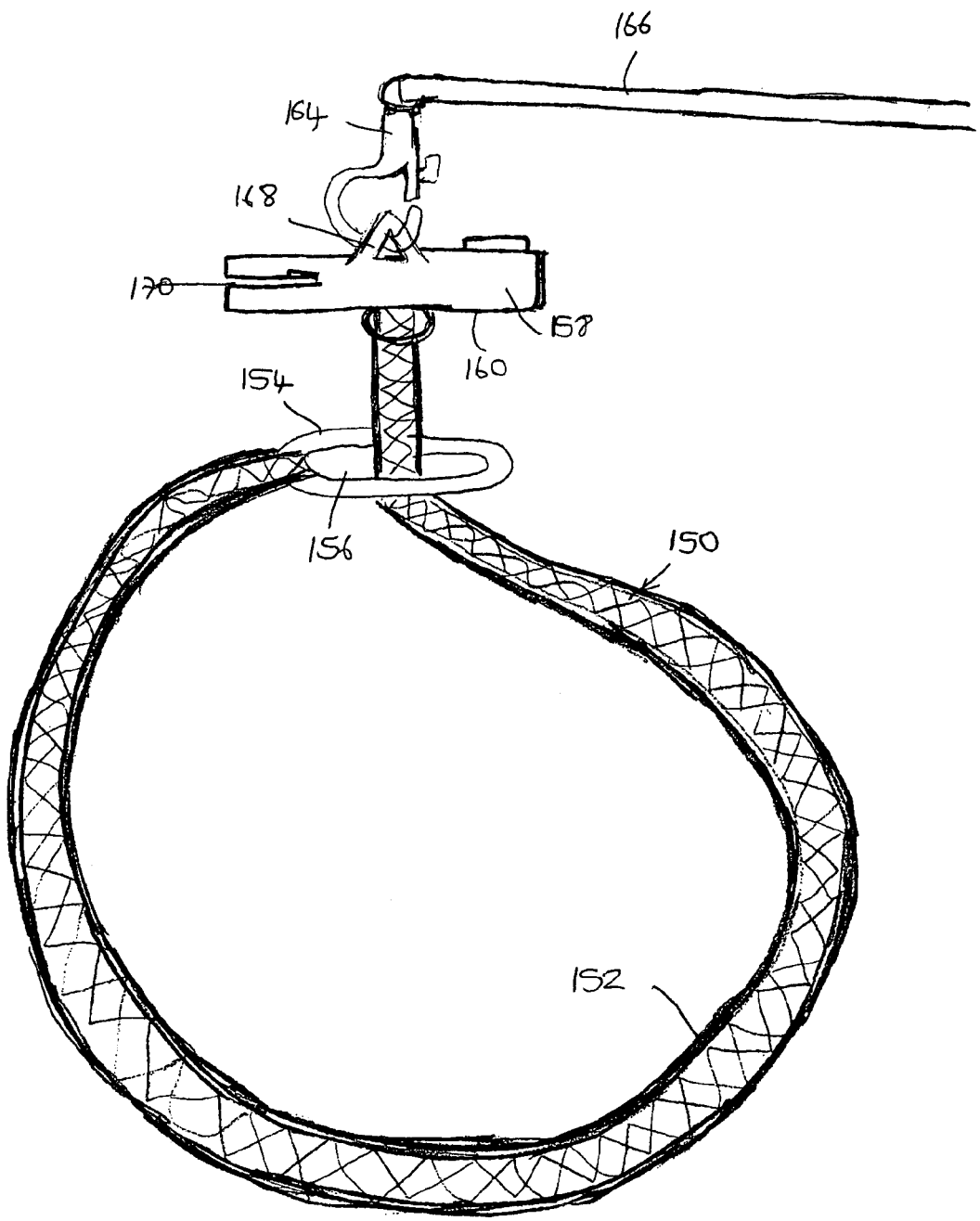
FIG. 6 is a front view of the collar of the invention as shown in FIG. 5 of the drawings in a secured position, and attached to a leash.

In FIG. 6 of the drawings, a collar, generally having features and elements as already described, is shown. The collar 150 shown in FIG. 6 has a cord 152, a metal ring 154 defining a space 156, and a fastening bar 158, which is capable of passing through the space 156 in a manner already described. The fastening bar 158 has a lower surface 160 which forms an abutment against the metal ring 154 to prevent it passing through the space 156, unless the fastening bar 158 is carefully oriented properly for this purpose.

FIG. 6 also shows a clamp 164 of a leash 166, which connects to a leash connector 168. A cutting mechanism 170 is provided in the fastening bar 158 to sever the cord, which is made of a non-metallic, but strong and flexible fabric or material, in case of emergency situations.

It will also be appreciated that the cutting mechanism for severing the cord of the dog collar may be in the form of a small blade or scissors which can be removed from the collar, such as from the fastening bar, entirely, so that it can be used to cut the cord. Preferably, in such a situation, the cutting member, such as a scissors or blade, is carefully attached to the fastening bar and covered appropriately so that all cutting surfaces are not exposed to prevent inadvertent injury. In such a situation, the cutting member may be attached to the fastening bar or other part of the collar by means of a thin wire or string, so that it will not be accidentally lost.

The collar of the invention thus provides a flexible and convenient way of attaching a collar to a dog in more than one manner (for example, over the head and neck or placing it directly around the neck), and allowing it to be removed in more than one manner such as by cutting the cord and sheath, or pulling it over the dog's head or disconnecting the fastening mechanism while on the dog, so that it is not necessary to pull it over the dog's head. Thus, options are available for putting on and removing the collar depending on the situation, and providing an escape in an emergency where the dog might get tangled or asphyxiated by the collar which has become tightened around its neck.

Preferably, the inner part of the cord is made of a braided or twisted nylon fabric, and is encased in a plastic material to prevent or decrease skin chaffing or fur damage.

The invention claimed is:

1. A dog collar comprising:
   a flexible non-metallic cord component comprised of at least two materials both of which can readily be severed by a blade or scissors, the cord component having first and second ends and comprising an inner cord comprised of a first material which is strong and resistant to breaking surrounded by an outer plastic second material cover which integrally encases the inner cord along its entire length and is selected for its ability to reduce chaffing; and
   a fastening mechanism having a band defining a space at the first end of the cord component and a fastening bar having a dedicated opening therein for connection to a leash at the second end of the cord component, the fastening bar and band being dimensioned such that the fastening bar is able to pass through the space in one orientation and not able to pass through the space when in other orientations; and
   the outer plastic material cover has a surface which enables it to slide easily in the space of the fastening mechanism when threaded therethrough in order that a loop formed by the cord component when the fastening bar is passed through the band can quickly and easily be opened and closed.

2. A dog collar as claimed in claim 1 wherein the inner cord comprises a braided nylon cord.

3. A dog collar as claimed in claim 1 wherein the outer cord sheath comprises a plastic sheath.

4. A dog collar as claimed in claim 1 wherein the outer cord sheath substantially surrounds the entire inner cord.

5. A dog collar as claimed in claim 1 wherein the band comprises a substantially circular metal ring.

6. A dog collar as claimed in claim 5 wherein the fastening bar comprises a central portion and a pair of lateral wings extending outwardly from the central portion, the height of the central portion and wings being less than the distance of the space.

7. A dog collar as claimed in claim 6 wherein the lateral wings taper from the central portion to an outer remote end thereof.

8. A dog collar as claimed in claim 1 wherein the fastening bar comprises a connector for connecting the fastening bar to a leash.

9. A dog collar as claimed in claim 1 wherein the fastening bar comprises a cutting mechanism thereon.

10. A dog collar as claimed in claim 9 wherein the fastening bar has a slot formed therein capable of receiving at least in part the cord component, the cutting mechanism comprises a first fixed cutting surface above the slot and a second movable cutting surface below the slot, the second movable cutting surface being selectively movable so as to engage with the first cutting surface and to sever the cord component when placed between the first and second cutting surfaces.

11. A dog collar as claimed in claim 10 wherein the second movable cutting surface is attached to an arm and a handle, the second movable cutting surface, arm and handle being pivotally mounted so that the second movable cutting surface is movable between a first position, away from the first cutting surface, and a second position, directly adjacent the first cutting surface.

12. A dog collar as claimed in claim 9 wherein the cutting mechanism comprises a slot in the fastening bar, the slot having therein at least one blade surface, the blade surface being capable of engaging the cord component and severing it when moved thereover.

* * * * *